(12) United States Patent
Wandyez

(10) Patent No.: US 6,409,947 B1
(45) Date of Patent: Jun. 25, 2002

(54) BLOW MOLDED HEADLINER

(75) Inventor: Gloria D. Wandyez, Birmingham, MI (US)

(73) Assignee: Textron Automotive Company, Inc., Troy, MI (US)

( * ) Notice: Subject to any disclaimer, the term of this patent is extended or adjusted under 35 U.S.C. 154(b) by 0 days.

(21) Appl. No.: 09/576,776

(22) Filed: May 23, 2000

Related U.S. Application Data

(62) Division of application No. 09/116,163, filed on Jul. 16, 1998, now Pat. No. 6,086,145.

(51) Int. Cl.⁷ .......................... B29C 44/06; B49C 49/04
(52) U.S. Cl. ...................... 264/45.9; 156/242; 156/245; 264/46.6; 264/540
(58) Field of Search .................. 264/523, 539, 264/46.6, 45.9, 540; 156/242, 245

(56) References Cited

U.S. PATENT DOCUMENTS 4,546,899 A * 10/1985 Williams .................. 264/46.6
5,328,651 A * 7/1994 Gallagher et al. ......... 264/46.6
5,885,515 A * 3/1999 Hudkins ..................... 264/516

* cited by examiner

Primary Examiner—Allan R. Kuhns
(74) Attorney, Agent, or Firm—Grossman, Tucker, Perreault & Pfleger, PLLC

(57) ABSTRACT

An automotive headliner assembly includes a substrate that is configured to mount to a vehicle in a position generally covering a lower surface of a passenger compartment roof. Cavities are formed into the substrate between the upper substrate surface and the lower substrate surface to provide receptacles for electrical wiring, fiber optic cabling, EA foam and the like or to form a duct for directing air flow. Each of the cavities is integrally formed in the substrate. A foam layer is adhered to a lower surface of the substrate and the decorative cover is adhered to a lower surface of the foam layer. The headliner is constructed by first extruding molten parison into a blow mold shaped to complement the desired exterior contours of the headliner substrate to be formed. The cavities are then formed in the molten parison by inserting at least one blow pin into the parison and injecting pressurized gas. For those cavities that are configured to hold energy-absorbing foam, foam is provided within each such cavity by inserting a nozzle into the cavities and filling the cavities with the foam.

15 Claims, 4 Drawing Sheets

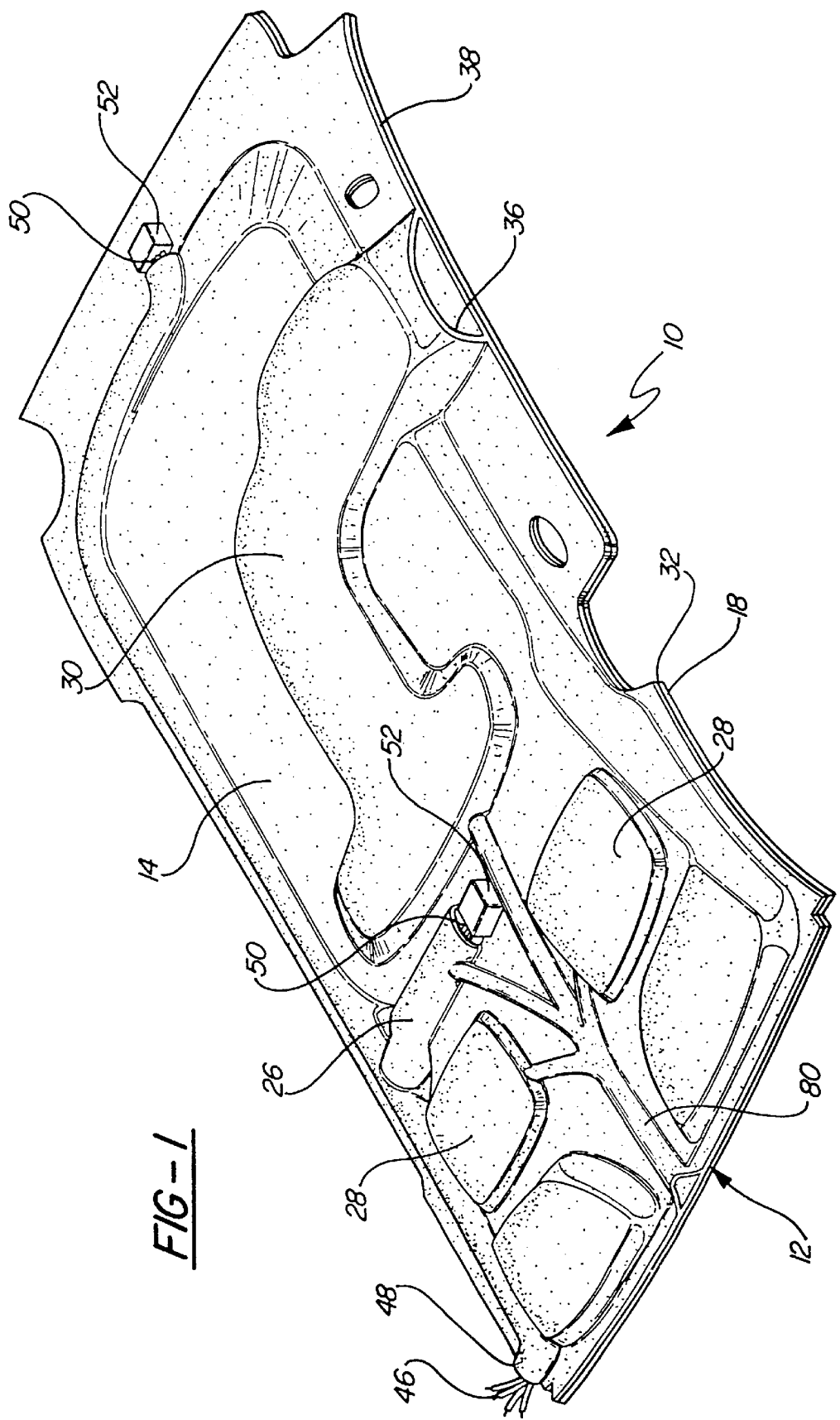

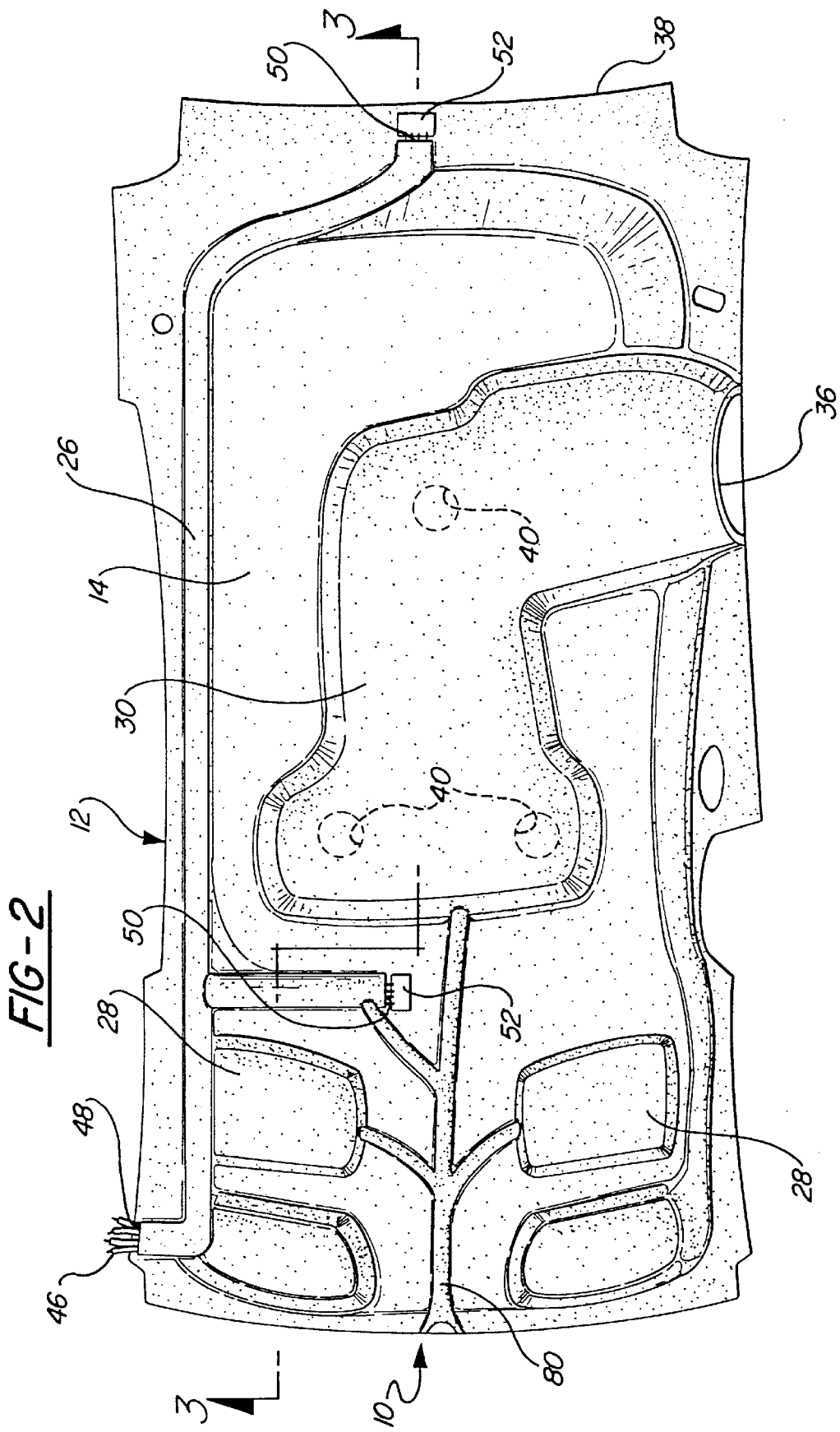

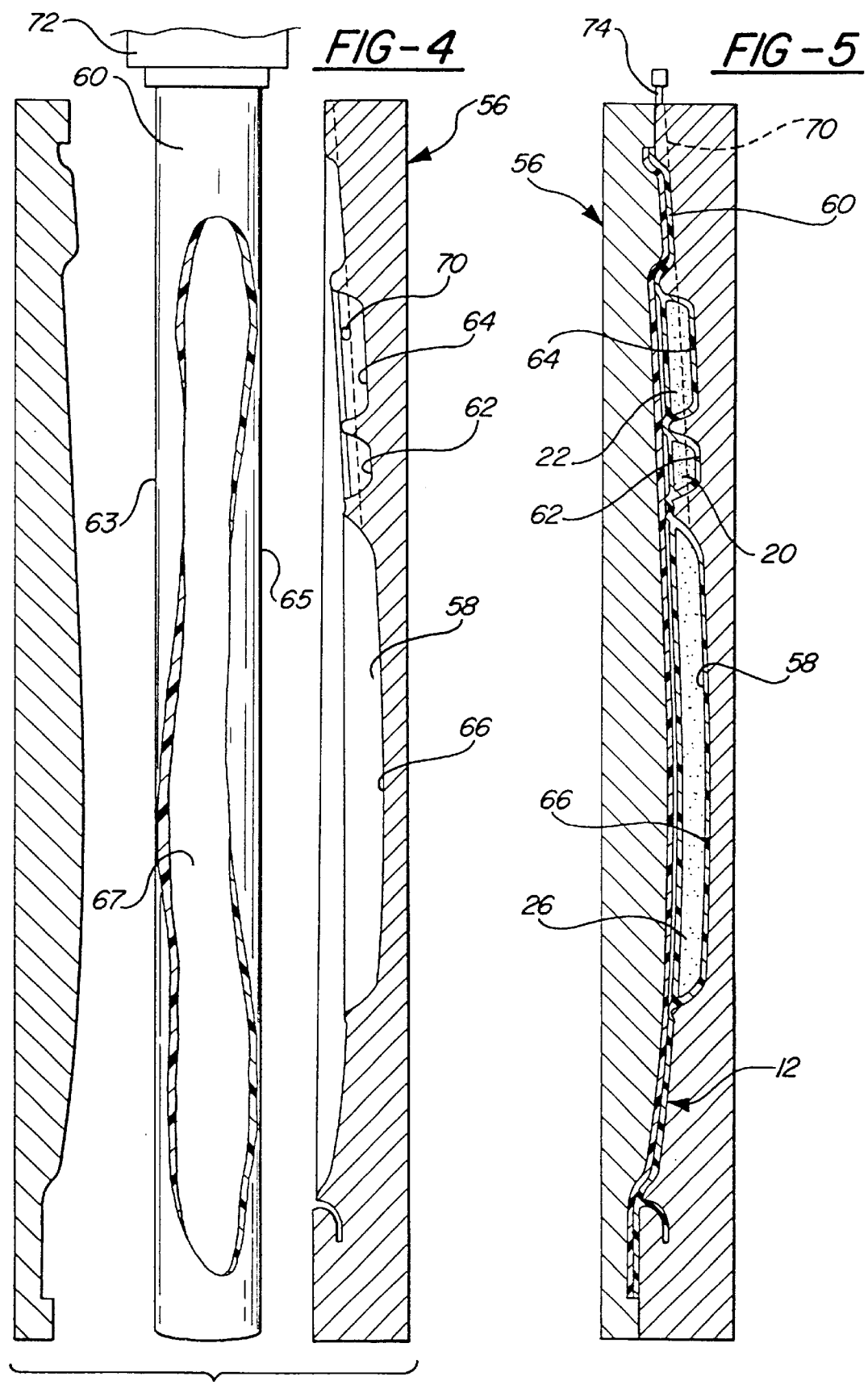

BLOW MOLDED HEADLINER

This application is a division of Ser. No. 09/116,163 filed Jul. 16, 1998 U.S. Pat. No. 6,086,145.

TECHNICAL FIELD

This invention relates generally to an automotive headliner having an integral cavity and a method for making such a headliner.

INVENTION BACKGROUND

Inside vehicle roof constructions sometimes include laminated headliners. Such headliners are used in many types of vehicles including passenger cars, vans, buses, trucks, trains and airplanes. Headliners are incorporated into vehicle roof constructions for a variety of reasons including aesthetics, sound absorption, energy absorption, and concealment of electrical wiring harnesses and air vents.

Materials currently used in headliner construction include particleboard, fiberboard, plastic board, scrim, fabric, plastic, various foams and resin-bonded chopped glass fiber. In some headliners, layers of these materials are joined together into a single laminate structure using lay-up-molding techniques. For example, some headliners are constructed using glass reinforced polyester resin laminated to a rigid urethane foam layer and covered by a soft urethane foam backed fabric. Other headliners are thermoformed laminates that include a polystyrene foam layer sandwiched between layers of kraft paper or polymer film material and covered with soft polyurethane foam-backed fabric. Some constructions eliminate the paper or polymer film covering from such laminates and substitute a non-woven fabric batt adhered to one or both sides of the foam layer. Still other headliners, rather than being layered constructions, are simply molded from a single layer of a composition such as fiberglass reinforced polyester resin.

Headliners are typically contoured to conform to the dimensions of the vehicle roof structure they are intended to cover. Their dimensions are also contoured to flow into adjacent interior vehicle trim panels, pillars and other such structures to present a pleasing, finished aesthetic appearance to vehicle occupants.

In U.S. Pat. No. 5,340,425, issued Aug. 23, 1994 to Strapazzini, the inventor proposes that headliners could be constructed to incorporate molded-in inserts of various kinds to include sound proofing material or decorative carpet-like material.

In addition, it is known in the art for headliner assemblies to include one or more electrical wiring harnesses. The harnesses are attached to hidden upper surfaces of such headliner assemblies using fasteners that route the wiring harnesses to a variety of sockets for the electrical accessories mounted to the headliners. The headliner assemblies are then mounted to a vehicle roof and an interconnecting wire harness in the vehicle is connected to one or more of the harnesses attached to the headliner assembly.

For example, U.S. Pat. No. 5,309,634, issued May 10, 1994 to Van Order et al. and assigned to Prince Corporation, discloses a headliner or roof panel that includes a variety of clips and mounts for wiring, lamps and the like. The Van Order et al. patent describes the roof panel as being formable from any one or more of a number of molded polymeric materials. The patent also discloses that the molded roof panel can be covered by a foam layer and a decorative outer cover. However, neither the Van Order et al. patent nor the Strapazzini patent disclose a headliner or a method for making a headliner with structures that can direct airflow in or out of a vehicle interior and/or support energy absorbing materials.

British patent application no. 1,115,212, published May 29, 1968, discloses an automotive headliner with a lower cushioning layer spaced from an upper roof covering by longitudinal ribs. The cushioning layer, roof covering and ribs define air ducts for supplying air to and removing air from the vehicle interior. According to the British application the ribs may be integrally formed with the cushioning layer but must be assembled to the roof covering in a separate step.

It is also known in the art for headliner assemblies to include a duct that is disposed on an upper surface of the headliners. Outlet registers are mounted in holes formed in the headliner at spaced locations. The duct directs airflow from a vehicle heating, ventilation and air conditioning system into a vehicle passenger compartment through the three air outlet registers. In such systems, the duct is formed separately from the headliner and is fastened to the headliner during manufacturing by such means as gluing.

It is also known to use blow-molded materials to form certain parts of instrument panels. An example of such a use is shown in U.S. Pat. No. 5,527,581, issued Jun. 18, 1996 to Sugawara et al. and assigned to a Japanese supplier of blow moldable materials. The instrument panel disclosed in the Sugawara et al. patent includes a core part having blow-molded sections that are formed from a parison. The parison is fixtured in a blow mold to form integral cavities in the form of airflow ducts in the instrument panel.

What is needed is a headliner configured to support such items as energy absorbing foam, passenger compartment airflow, and electrical wiring while presenting a continuous, unencumbered aesthetic appearance to vehicle occupants. What is also needed is a cost-effective method for making such a headliner.

INVENTION SUMMARY

In accordance with this invention an automotive headliner assembly is provided that includes a cavity formed into the substrate between upper and lower substrate surfaces to provide a receptacle for wiring, foam and the like or to provide a duct for directing airflow. The headliner assembly is configured to line the roof of the passenger compartment of a vehicle. The headliner assembly comprises a unitary substrate configured to be mounted to a vehicle in a position generally covering a lower surface of a passenger compartment roof. The lower substrate surface is disposed opposite the upper substrate surface. The substrate comprises a moldable material. A decorative cover may be supported on the lower substrate surface.

According to another aspect of the invention, the cavity comprises an air duct and the headliner includes an air inlet opening positioned to receive air from a vehicle air handling system. An air outlet opening is spaced from the air inlet opening and disposed in an underside surface of the headliner assembly to direct air from the vehicle air handling system into the passenger compartment. The air duct extends between and connects the air inlet opening and the air outlet opening to provide gaseous communication between the air inlet opening and the air outlet opening. Because the air duct is formed into the headliner substrate, the headliner assembly includes fewer parts and its fabrication is greatly simplified.

According to another aspect of the invention a directional air outlet register is disposed in the air outlet opening.

According to another aspect of the invention the cavity comprises an elongated conduit and the headliner includes a cable inlet opening disposed adjacent a peripheral edge of the headliner assembly to receive electrical or fiber optic cabling from a vehicle electrical or fiber optic system. A cable outlet opening is spaced from the cable inlet opening and is disposed adjacent a fixture supported on the headliner assembly to allow an end of the cable to be connected to the fixture. The cable conduit extends between and provides a channel between the cable inlet opening and the cable outlet opening.

According to another aspect of the invention, foam is disposed within the cavity. The cavity may include an inner wall that envelops the foam. The foam may be energy-absorbing foam to enhance the ability of the cavity to absorb passenger head impact forces. The foam may be an acoustic energy-absorbing foam to reduce noise levels within the passenger compartment.

According to another aspect of the invention additional foam-filled cavities are disposed in an array at spaced locations where passenger head impact is likely to occur if passengers are subjected to sudden vertical acceleration components.

According to another aspect of the invention the cavity is integrally formed in the substrate.

According to another aspect of the invention, a decorative outer cover is disposed on a lower surface of the substrate. A foam layer may be included between the lower surface of the substrate and the decorative outer cover.

According to another aspect of the invention, a method is provided for constructing a headliner. According to the method a blow mold is provided, the blow mold having a contoured portion shaped to complement the desired exterior contours of the headliner substrate to be formed. The contoured portion includes an enlarged region corresponding to a desired cavity position in the substrate to be formed. A molten parison is then extruded into the hollow portion of the blow mold and the parison is expanded into conforming contact with the contoured portion of the blow mold by injecting gas into the molten parison. The molten parison is then allowed to harden into the headliner substrate and the substrate is removed from the blow mold.

According to another aspect of the inventive method, the molten parison is provided between open halves of a two-piece blow mold. The two blow mold halves are closed together around the molten parison before fully expanding the molten parison.

According to another aspect of the inventive method, a layer of foam is provided on a lower surface of the substrate and a layer of cover material is provided on a lower surface of the foam.

According to another aspect of the inventive method, foam is provided within the cavity.

According to another aspect of the inventive method, foam is provided within the cavity by first inserting one end of an injection nozzle. Foam is then injected into the cavity through the nozzle and the nozzle is withdrawn from the cavity.

According to another aspect of the inventive method, the molten parison is extruded.

According to another aspect of the inventive method, the molten parison is expanded by inserting a blow pin into the molten parison, injecting the gas into the parison through the blow pin and removing the blow pin from the parison.

BRIEF DESCRIPTION OF THE DRAWINGS

To better understand and appreciate the invention, refer to the following detailed description in connection with the accompanying drawings:

FIG. 1 is a perspective view of a headliner assembly constructed according to the present invention;

FIG. 2 is a top view of the headliner assembly of FIG. 1;

FIG. 4 is a cross-sectional side view of a blow-mold with a parison extrusion die injecting a molten parison between halves of the die in accordance with the method of the present invention; and FIG. 5 is a cross-sectional side view of the blow mold of FIG. 4 with a blow pin injecting gas into the molten parison in accordance with the method of the present invention.

PREFERRED EMBODIMENT DESCRIPTION

Figure 3A:
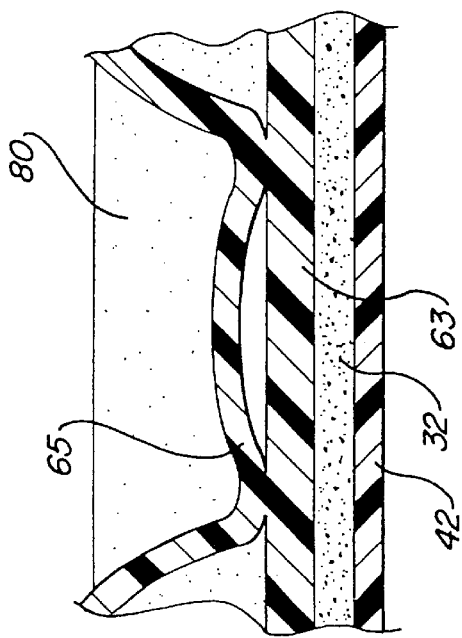
FIG. 3A is an enlarged view of the region bounded by circle 3A in FIG. 3.
Figure 3:
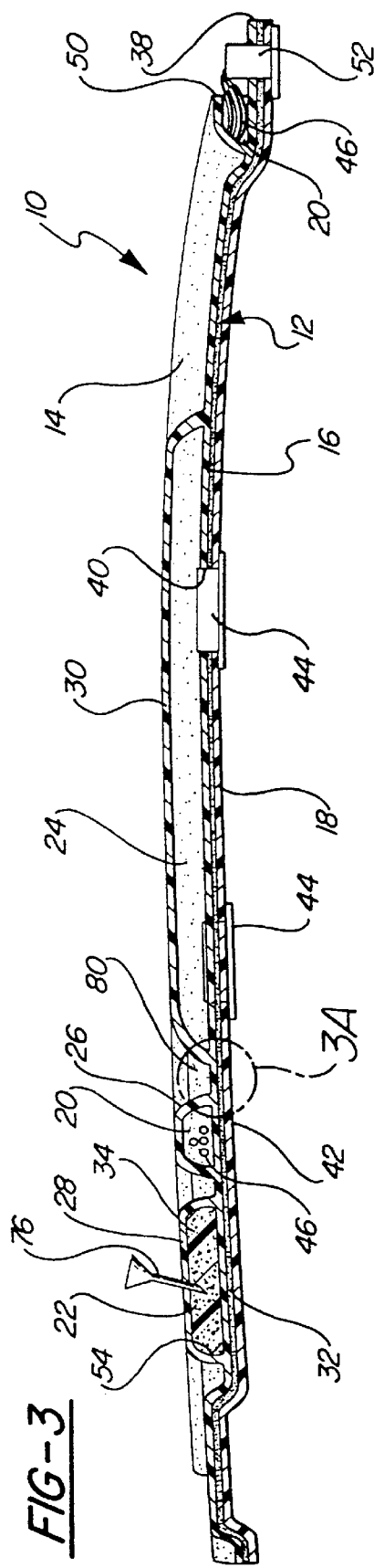
FIG. 3 is a cross-sectional side view of the headliner assembly of FIG. 1 taken along line 3—3 in FIG. 2.

A headliner assembly for lining the roof of the passenger compartment of a vehicle is generally shown at 10 in FIGS. 1–3. The headliner assembly 10 includes a unitary substrate, generally indicated at 12 in FIGS. 1–3, that is configured to mount to a vehicle in a position generally covering a lower surface of a passenger compartment roof (not shown). The substrate 12 includes an upper substrate surface shown at 14 in FIGS. 1–3 and a lower substrate surface shown at 16 in FIG. 3. The lower substrate surface 16 is disposed opposite the upper substrate surface 14. The substrate 12 may be made of any suitable moldable material to include various plastics or fiberglass reinforced polyester resin.

A decorative cover, shown at 18 in FIG. 3, is supported on the lower substrate surface 16. The decorative cover 18 may be in the form of a fabric or solid layer of any suitable material.

Cavities, shown at 20, 22 and 24 in FIG. 3 are formed into the substrate 12 between the upper substrate surface 14 and the lower substrate surface 16. One of the cavities, shown at 20 in FIG. 3 is defined by an elongated receptacle or conduit, shown at 26 in FIGS. 1–3. The conduit 26 is configured to support electrical wiring or fiber optic cabling.

Two of the cavities, shown at 22 in FIG. 3, are defined by generally rectangular pockets, shown at 28 in FIGS. 1–3. As best shown in FIG. 3, the pockets 28 are configured to hold energy absorbing foam 34. In other embodiments, the pockets 28 may be filled with acoustic energy or sound absorbing foam or other energy-absorbing materials or structures. In still other embodiments, the pockets 28 may be configured to absorb passenger head impact energy without the aid of foam filling.

The largest of the cavities, shown at 24 in FIG. 4, is defined by a contoured duct shown at 30 in FIGS. 1–3. The duct 30 is configured to direct airflow into a vehicle passenger compartment.

Each of the cavities 20, 22, 24 is preferably integrally formed in the substrate 12. In other words, the conduit 26, compartments 28 and duct 30 are integrally formed with the substrate 12 as a single unitary piece.

A foam layer, shown at 32 in FIG. 3, is preferably disposed on a lower surface of the substrate 12 and the decorative outer cover 18 is disposed on a lower surface of the foam layer 32. The foam layer 32 and decorative outer cover 18 may be fastened in place by adhesives or any other suitable means.

Cavity 24 and air duct 30 protrude upward from the substrate 12 and have rounded contours to facilitate airflow. At one end of the air duct 30 the headliner assembly 10 includes an air inlet opening shown at 36 in FIGS. 1 and 2.

The air inlet opening 36 is disposed adjacent a peripheral edge 38 of the headliner assembly 10 and is configured to receive air into the air duct 30 from a vehicle air handling system, e.g., a heating, ventilating and air conditioning (HVAC) system (not shown). Three air outlet openings are shown at 40 in FIGS. 2 and 3. The air outlet openings 40 are spaced from each other and are spaced from the air inlet opening 36. The air outlet openings 40 are disposed in a triangular array and extend through a thickness of the headliner assembly 10. The air outlet openings 40 direct air from the vehicle air handling (HVAC) system into the passenger compartment. The air duct 30 extends between and connects the air inlet opening 36 and the air outlet openings 40 to provide gaseous communication between the air inlet opening 36 and the air outlet openings 40.

A directional air outlet register, shown at 44 in FIG. 3, is rotatably mounted within each air outlet opening 40 and protrudes from an underside surface 42 of the headliner assembly 10. The directional air outlet registers 44 allow passengers to direct air to various parts of the passenger compartment.

Similar to the air duct 30, the conduit 26 protrudes upward from the substrate 12. The conduit 26 is configured to support wires or cables 46 that will conduct electricity, light, or other forms of electromagnetic radiation to various points in the headliner assembly 10. More specifically, the conduit 26 defines an elongated tube. The cross-sectional shape of the conduit 26 may be any suitable shape for holding cables 46. The headliner assembly 10 includes a cable inlet opening 48 at one end of the conduit 26 and disposed adjacent the peripheral edge 38 of the headliner assembly 10. The cable inlet opening 48 is positioned to receive cables 46 leading to the vehicle roof from a vehicle electrical or fiber optic system.

Two cable outlet openings, shown at 50 in FIGS. 1–3 are spaced from the cable inlet opening 48. The cable outlet openings 50s are disposed adjacent respective electrical or fiber-optic light fixtures shown at 52 in FIGS. 1–3. In the present embodiment, the fixtures 52 are electrical dome lights. However, in other embodiments, each fixture 52 may include, for example, a fiber optic dome or indicator light. Each fixture 52 may also include a roof-mounted electronic accessory such as a radio, television, computer monitor, tape deck or CD-player that is supported on or adjacent the headliner assembly 10. The cable outlet openings 50 are disposed adjacent such fixtures 52 to allow the electrical or fiber optic cables to be connected to the fixtures 52. The cable conduit 26 extends between and connects the cable inlet opening 48 and the cable outlet openings 50.

The pockets 28 support energy absorbing foam 34 in strategic locations in the substrate 12. Each pocket 28 includes an inner wall 54 that envelops and seals the energy-absorbing foam 34 within the pocket 28. The foam-filled cavities 22 of the pockets 28 are disposed in an array at spaced locations where passenger head impact is likely to occur if passengers are subjected to sudden vertical acceleration components. The two pockets 28 of the present embodiment are disposed directly above the seating locations for the driver and the front seat passenger as shown in FIGS. 1–3.

The headliner assembly 10 may be constructed according to the present invention by first fabricating a two-piece clamshell-type blow mold as is generally indicated at 56 in FIGS. 4 and 5. The mold 56 is fabricated to include a hollow portion, shown at 58 in FIGS. 4 and 5, for receiving molten parison 60 and shaping exterior contours of the headliner substrate 12 to be formed. In fabricating the mold 56, the hollow portion 58 of the mold 56 is shaped to complement desired exterior contours of the headliner substrate 12 to be formed. As shown in FIGS. 4 and 5, the hollow portion 58 is also configured to include enlarged regions 62, 64, 66 corresponding to respective cavities 20, 22, 24 to be formed in the substrate 12. An additional hollow portion forms an air passage, shown at 70 in FIGS. 4 and 5, at one end of the mold 56 when the two halves are joined together. The air passage is configured to receive an air injector such as a blow pin 74. The air passage 70 branches to the enlarged regions 62, 64, 66 of the hollow portion 58 of the mold 56 to allow air to be injected into each of the enlarged regions 62, 64, 66 from the air injector.

Once the mold 56 has been fabricated, a molten parison 60 is extruded downward between the open mold halves and into the hollow portion 58 within the blow mold 56. As shown in FIG. 4, a parison extrusion die 72 extrudes the parison 60 in the form of an oblong, hollow tube. The mold halves are then closed together around the tubular parison 60, pinching together opposed walls 63, 65 of parison along outer boundaries of the enlarged regions 62, 64, 66. Pressurized gas is then injected into a hollow center region 67 of the molten tubular parison 60 causing the parison 60 to expand within the enlarged regions 62, 64, 66 of the hollow portion 58 of the mold 56. The pressurized gas also causes the parison 60 to expand within the gas passage 70, conforming to the contours of the gas passage 70 as shown at 80 in FIGS. 1–3A. After the cavities 20, 22, 24 have been formed in the parison 60, the blow pin 74 may be removed from the parison 60.

The parison 60 is then allowed to harden into the desired shape of the headliner substrate 12. The blow mold 56 is then opened and the headliner substrate 12 is removed. Following hardening and removal of the headliner substrate 12, the foam layer 32 is adhesively applied to the substrate lower surface 16 and the decorative outer cover 18 or skin is adhesively applied to the lower surface of the foam layer 32. Alternatively, the decorative outer cover 18 and foam layer 32 may be placed in the blow mold 56 before molding and integrally joined during molding. As another alternative, the outer cover 18 and foam layer 32 may be coextruded at the same time as a multi-layered parison.

As shown in FIG. 3, foam 34 is provided within the pocket cavities 22 by inserting nozzle portions 76 of one or more foaming machines into the pocket cavities 22 and filling the pocket cavities 22 with the foam 34. Preferably, the foam is urethane foam produced via a reaction injection molding process. This may be accomplished either before or after the headliner substrate 12 is removed from the mold 56. Foam injection may also occur instead of gas injection in forming the pocket cavities 22 rather than after gas injection and pocket cavity formation. After foam injection is complete the foam injection nozzles 76 are then withdrawn from the pocket cavities 22 and the foam 34 allowed to cure.

The description and drawings illustratively set forth my presently preferred invention embodiment. I intend the description and drawings to describe this embodiment and not to limit the scope of the invention. Obviously, it is possible to modify this embodiment while remaining within the scope of the following claims. Therefore, within the scope of the claims, one may practice the invention otherwise than as the description and drawings specifically show and describe.

I claim:

1. A method for making a headliner comprising a substrate configured to be mounted to a vehicle in a position at least partially covering a lower surface of a passenger compartment roof, the substrate comprising an upper substrate surface and a lower substrate surface disposed opposite the upper substrate surface, and a substrate peripheral edge, the substrate comprising a moldable material, and a cavity formed into the substrate between the upper substrate surface and the lower substrate surface; the method including the steps of:

providing a blow mold having first and second opposing wall surfaces contoured to complement the exterior contours of the headliner substrate to be formed, including an enlarged region corresponding to a cavity position in the substrate to be formed;

providing a molten parison into the blow mold between said first and second opposing wall surfaces, said molten parison being formed with opposed walls;

expanding the molten parison with opposed walls into conforming contact with said first and second wall surfaces of the blow mold by injecting gas into the molten parison;

forming a headliner substrate having a cavity formed within by pinching together said first and second opposed walls of said parison at a location within said peripheral edge;

allowing the molten parison to harden;

removing the headliner substrate from the blow mold; and providing a layer of foam on a lower surface of the substrate and providing a layer of cover material on the lower surface of the foam.

2. The method of claim 1 in which the step of forming the headliner substrate by injecting gas into the molten parison and expanding the molten parison includes the additional steps of:

inserting a blow pin into the molten parison;

injecting the gas into the parison through the blow pin; and removing the blow pin from the parison.

3. The method of claim 1 including the additional step of providing the cavity with one inlet opening.

4. The method of claim 3 in which the step of providing the cavity with at least one inlet opening includes providing an air inlet opening.

5. The method of claim 4 in which the step of providing the cavity with at least one inlet opening includes providing a cable inlet opening.

6. The method of claim 1 including the additional step of providing the cavity with at least one outlet opening.

7. The method of claim 6 in which the step of providing the cavity with at least one outlet opening including providing an air outlet opening.

8. The method of claim 1 in which the step of providing the cavity with at least one outlet opening includes providing a cable outlet opening.

9. The method of claim 1 wherein said step of providing a layer of foam on said lower surface of the substrate and providing a layer of cover material on the lower surface of said foam comprises supplying a cover material that includes a layer of foam on said cover material.

10. The method of claim 1 including the step of providing foam within said cavity prior to removing said headliner substrate from said blow mold.

11. The method of claim 1 wherein the step of providing said molten parison comprises extruding said molten parison.

12. The method of claim 11 wherein said cover material and foam is coextruded with said parison.

13. The method of claim 1 wherein said step of providing a layer of foam on said lower surface of the substrate and providing a layer of cover material on the lower surface of said foam comprises placing said cover material and foam in said blow mold and joining said foam to said parison when said parison is expanded in said blow mold.

14. A method for making a headliner comprising a substrate configured to be mounted to a vehicle in a position at least partially covering a lower surface of a passenger compartment roof, the substrate comprising an upper substrate surface and a lower substrate surface disposed opposite the upper substrate surface, and a substrate peripheral edge, the substrate comprising a moldable material, and a cavity formed into the substrate between the upper substrate surface and the lower substrate surface; the method including the steps of:

providing a blow mold having first and second opposing wall surfaces contoured to complement the exterior contours of the headliner substrate to be formed, including an enlarged region corresponding to a cavity position in the substrate to be formed;

providing a molten parison into the blow mold between said first and second opposing wall surfaces, said molten parison being formed with opposed walls;

expanding the molten parison with opposed walls into conforming contact with said first and second wall surfaces of the blow mold by injecting gas into the molten parison;

forming a headliner substrate having a cavity formed within by pinching together said first and second opposed walls of said parison at a location within said peripheral edge;

allowing the molten parison to harden;

removing the headliner substrate from the blow mold; and providing foam within said cavity.

15. The method of claim 14 in which the step of providing a foam includes the steps of:

inserting one end of a nozzle into the cavity;

injecting the foam into the cavity through the nozzle; and withdrawing the nozzle from the cavity.

* * * * *